(12) United States Patent
Powers et al.

(10) Patent No.: US 7,855,712 B2
(45) Date of Patent: Dec. 21, 2010

(54) REPLACEABLE INSTRUMENT MECHANISM FOR HAPTIC DEVICES

(75) Inventors: Marilyn J. Powers, Pointe Claire (CA); Ian Sinclair, Beaconsfield (CA)

(73) Assignee: MPB Technologies Inc., Pointe-Claire, Québec (CA)

( * ) Notice: Subject to any disclaimer, the term of this patent is extended or adjusted under 35 U.S.C. 154(b) by 856 days.

(21) Appl. No.: 11/423,243

(22) Filed: Jun. 9, 2006

(65) Prior Publication Data

US 2006/0279534 A1    Dec. 14, 2006

Related U.S. Application Data

(60) Provisional application No. 60/689,066, filed on Jun. 10, 2005.

(51) Int. Cl.
*G09G 5/00* (2006.01)
(52) U.S. Cl. ...................................................... 345/156
(58) Field of Classification Search ................. 345/156
See application file for complete search history.

(56) References Cited

U.S. PATENT DOCUMENTS

| | | | | |
|---|---|---|---|---|
| 3,834,022 A * | 9/1974 | Students | ..................... | 30/261 |
| 5,731,804 A | 3/1998 | Rosenberg | | |
| 5,792,135 A * | 8/1998 | Madhani et al. | ................. | 606/1 |
| 6,163,668 A * | 12/2000 | Takahashi et al. | ........... | 399/144 |
| 6,212,780 B1 * | 4/2001 | Huang | .......................... | 30/232 |
| 6,593,907 B1 * | 7/2003 | Demers et al. | .............. | 345/156 |
| 6,684,129 B2 | 1/2004 | Salisbury, Jr. et al. | | |
| 2004/0149065 A1 * | 8/2004 | Moran | ..................... | 74/490.04 |

\* cited by examiner

*Primary Examiner*—Amr Awad
*Assistant Examiner*—Kenneth Bukowski
(74) *Attorney, Agent, or Firm*—Ogilvy Renault LLP

(57) ABSTRACT

A replaceable instrument mechanism for a haptic device comprises a coupler having a coupler body adapted to be connected to an output end of the haptic device. A force transmission mechanism is connected to the coupler body, has a movable connector displaceable along one degree-of-freedom with respect to the coupler body, and is connected to a force feedback system of the haptic device so as to receive force feedback from the haptic device and impart the force feedback to the movable connector. An instrument has an instrument body having a connector end releasably secured to the second end of the coupler body so as to be displaceable with the coupler. A handle portion is manually actuatable in one degree-of-freedom with respect to the instrument body to simulate an operation performed with the instrument. A member is associated with the handle portion so as to move by actuation of the handle portion, and releasably connected to the movable connector of the force transmission mechanism so as to transmit force feedback from the movable connector to the handle portion in response to actuation of the handle portion as detected by the haptic device.

15 Claims, 12 Drawing Sheets

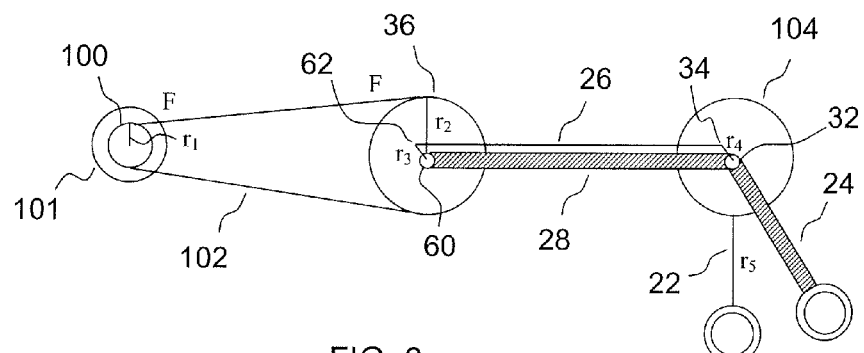
FIG. 6a
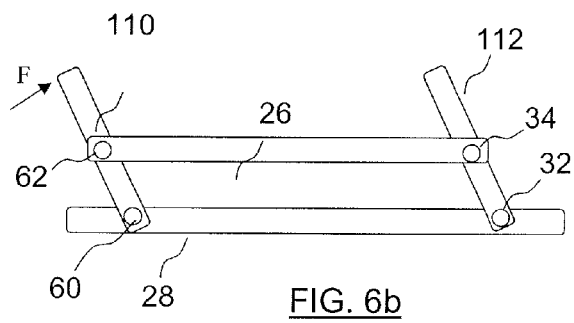
FIG. 6b
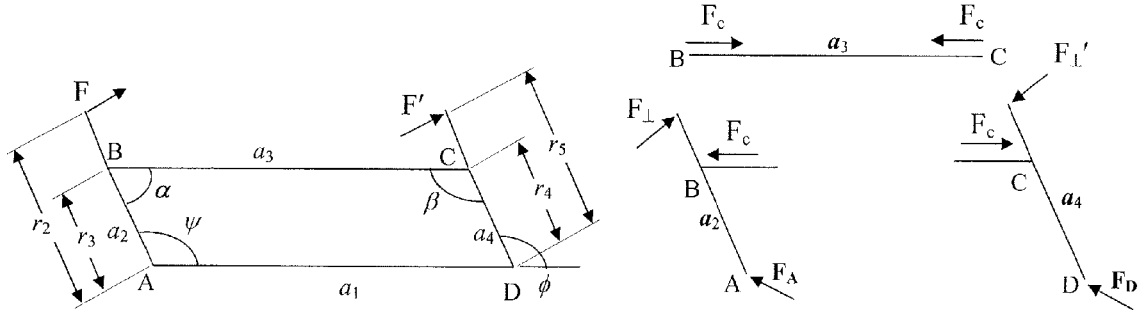
FIG. 6c
Fig. 6d

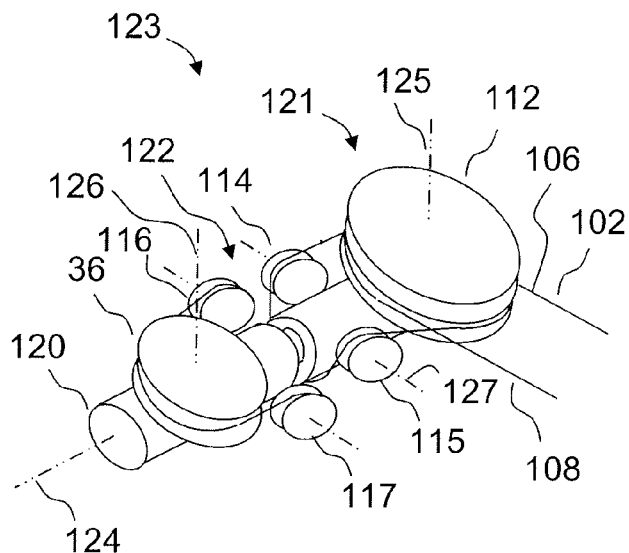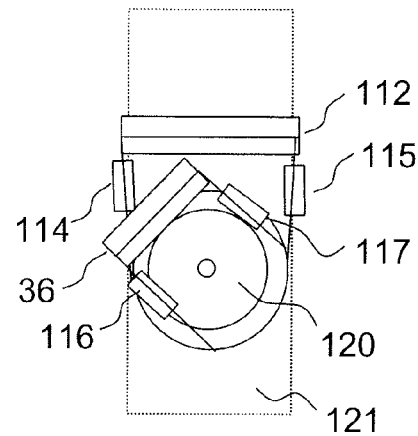
FIG. 7    FIG. 8
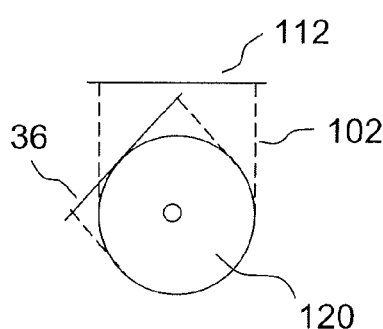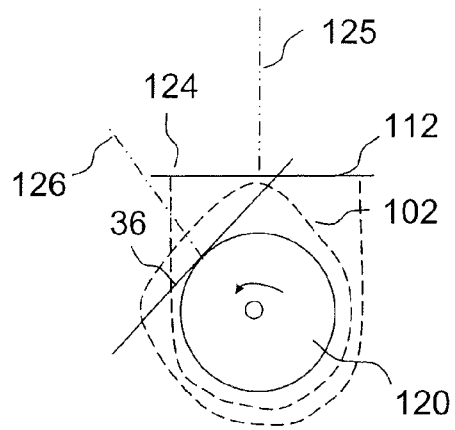
FIG. 9a    FIG. 9b

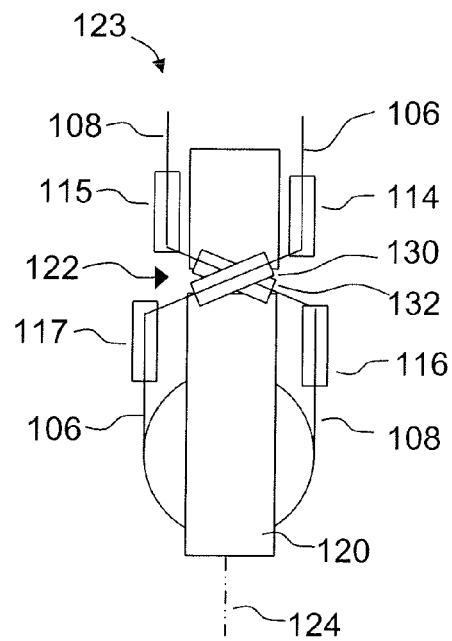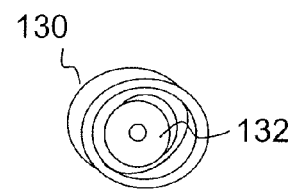
FIG. 10a    FIG. 10b
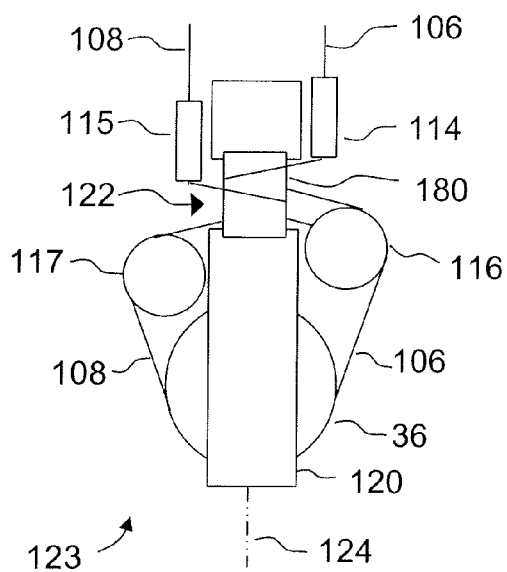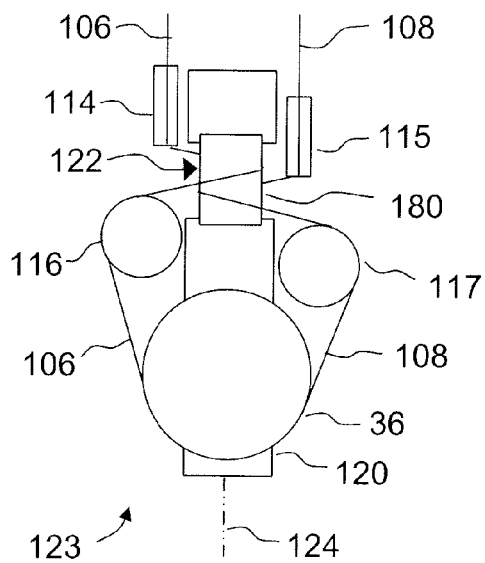
FIG. 10c    FIG. 10d

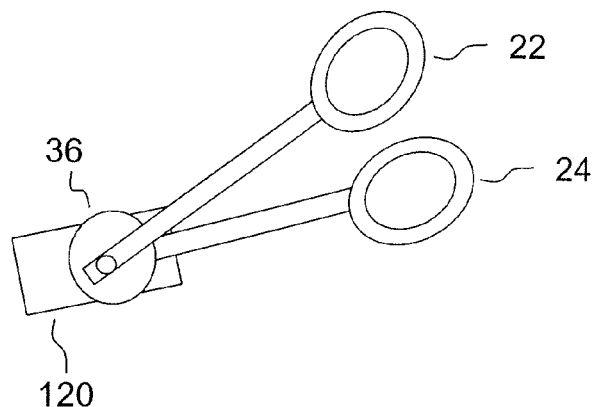
FIG. 11a
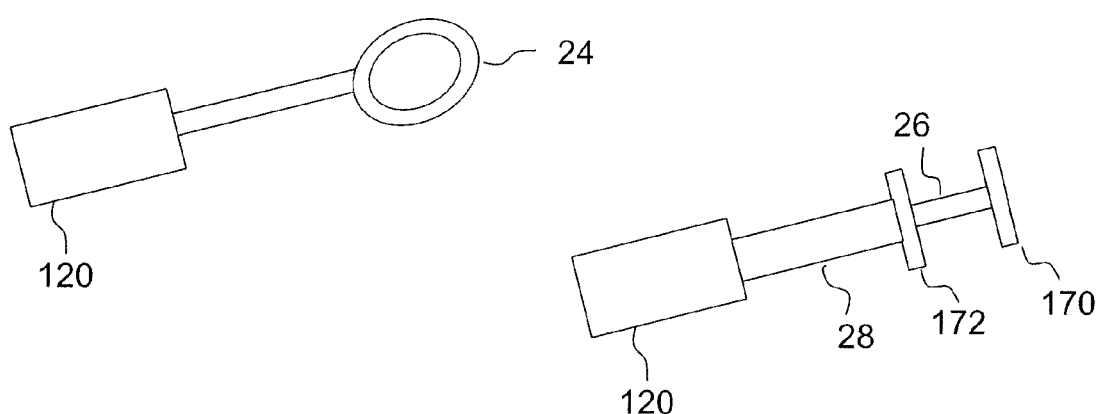
FIG. 11b
FIG. 11c

REPLACEABLE INSTRUMENT MECHANISM FOR HAPTIC DEVICES

CROSS-REFERENCE TO RELATED APPLICATION

This patent application claims priority on U.S. Provisional Patent Application No. 60/689,066, filed on Jun. 10, 2005.

BACKGROUND OF THE INVENTION

1. Field of the Invention

The present invention relates to force feedback haptic devices (a.k.a., hand controllers), particularly to six-degree-of-freedom hand controllers with interchangeable instruments involving revolute or prismatic jointed handles.

2. Background Art

Force-reflecting master hand controllers have been used to drive robotic systems, and to provide an interface to a computer system that allows the user to input spatial position and to feel forces in response to his or her movement.

In U.S. Pat. No. 6,593,907, issued on Jul. 15, 2003 to Demers et al., a tendon-driven hand controller that provides powered translation in three degrees of freedom, and powered rotation in three degrees of freedom is described.

The six-degree-of-freedom (6-DOF) hand controller is especially useful in surgical simulation. A virtual force may be presented as if it were acting at any location on a handle held by the operator. The force that is felt can therefore mimic the feeling of surgical instruments as they are used in an operation.

To this point, it has been possible to simulate instruments with single handles, such as a scalpel, but many instruments involve their own degree-of-freedom mechanisms, such as two members connected by a revolute joint. Scissors, forceps, clamps and rongeurs fall under this category. Moreover, the varieties of such instruments number in the tens of thousands, as they are created for cutting and manipulating tissue in many different surgical procedures.

In spite of the large variety of instruments, a limited number of handles for hand controllers have been designed for these instruments, since the human hand has a limited number of shapes and sizes.

There do exist surgical simulators with fixed handles and a limited number of degrees of freedom. Rosenberg, in U.S. Pat. No. 5,731,804, issued on Mar. 24, 1998, describes a 4-DOF hand controller with a gripper handle. This device is intended to simulate an endoscopic surgical instrument, in which the working surfaces are at the end of long shafts inserted through holes in the patient's body. The simulated endoscopic surgical instrument however appears to be permanently part of the hand controller.

Likewise, U.S. Pat. No. 6,684,129, issued to Salisbury, Jr. et al. on Jan. 27, 2004, discloses the operation of the master controller of the robotic surgical system from Intuitive Surgical Inc. The master controller has six degrees of freedom, plus one degree for activation of a gripper. The handle, however, is fixed to the device, and designed to enable the operator to manipulate the various tools of the surgical system.

SUMMARY OF INVENTION

It is therefore an aim of the present invention to provide an haptic device addressing issues associated with the prior art.

It is also an aim of the present invention to provide a novel replaceable instrument mechanism.

Therefore, in accordance with the present invention, there is provided a replaceable instrument mechanism for a haptic device, comprising: a coupler having: a coupler body with a first end and a second end, the first end adapted to be connected to an output end of the haptic device so as to be displaceable along the degrees-of-freedom of the haptic device; and a force transmission mechanism connected to the coupler body, the force transmission mechanism having a movable connector displaceable along at least one degree-of-freedom with respect to the coupler body, the force transmission mechanism adapted to be connected to a force feedback system of the haptic device so as to receive force feedback from the haptic device and impart the force feedback to the movable connector; at least one instrument having: an instrument body having a connector end releasably secured to the second end of the coupler body so as to be displaceable with the coupler; a handle portion manually actuatable in at least one degree-of-freedom with respect to the instrument body to simulate an operation performed with the instrument; and a member associated with the handle portion so as to move by actuation of the handle portion, and releasably connected to the movable connector of the force transmission mechanism so as to transmit force feedback from the movable connector to the handle portion in response to actuation of the handle portion as detected by the haptic device.

Therefore, in accordance with the present invention, there is provided a scissors mechanism comprising a fixed shaft and a sliding shaft, the fixed shaft having a coupler at one end and a fixed handle at the other end with a loop or a bar for the part of the hand near or at the thumb, the sliding shaft having a coupler at one end and a revolute joint at the other end, the revolute joint attaching a moving handle, the handle also being attached by a revolute joint to the end of the fixed shaft near the fixed handle, so that moving the movable handle moves the sliding shaft by a lever action.

Also in accordance with the present invention, there is provided a mechanism for coupling the scissors mechanism to a platform, comprising a coupler to attach the fixed shaft fixedly to the platform, and a second coupler for coupling the sliding shaft to a driven slider, the driven slider being a member connected to the platform by a prismatic joint, having a coupler at one end and a driving means somewhere else along its length. In a preferred embodiment, the driving means is a revolute joint attached to a scissors drive pulley at a radius r, the scissors drive pulley being attached to the platform by a revolute joint at the centre of the scissors drive pulley.

Also in accordance with the present invention, there is provided a mechanism for uncoupling the fixed shaft from the hand controller, and for uncoupling the sliding shaft from the driven slider. In a preferred embodiment, the coupling/uncoupling mechanism of both the fixed shaft and the sliding shafts each comprise a spring-loaded lever that presses a latch member into a recess in the side of the shaft, the lever being attached at its midpoint to the moveable base by a revolute joint, having a button end and a latch end, with a tension spring under the button end pushing the button end away from the platform, such that the latch end presses the latch member into the recess in the shaft, and such that a user may press the button end to release the latch mechanism, freeing the shaft so that it may be withdrawn from the platform.

Also in accordance with the present invention, there is provided a mechanism for actuating the driven slider, comprising a tendon routed around a configuration of idler pulleys that brings it from a capstan attached to the shaft of a rotary actuator on a fixed base through six joints of the 6-DOF hand controller (comprising two joints in a shoulder, an elbow joint, and pitch, yaw and roll joints in a spherical wrist) to the platform on the sixth and last joint in the hand controller, consisting of a shoulder pulley, an elbow pulley, a yaw idler pulley, and a roll-routing configuration of pulleys, consisting of a pair of inward idlers that accepts the tendon from the yaw pulley and redirects the tendon tangentially to the roll of the platform, a pair of cross over idlers that allows the tendon halves to cross over at the roll joint, and a pair of outward idlers that directs the tendon from a direction tangential to the roll of the platform to the direction of the scissors drive pulley.

Also in accordance with the present invention, there is provided a mechanism for sensing the angle of the scissors opening, consisting of either an angle sensor on the scissors joint, or an angle sensor on the scissors drive pulley, or a linear sensor measuring the movement of the slider shaft relative to the fixed shaft.

While the preferred embodiment of the platform and the tendon routing is a 6-DOF device as just described, the interchangeable handles and the platform may be mounted on a hand controller having any number of degrees of freedom, from a device attached to a fixed base to a multi-degree-of-freedom device.

BRIEF DESCRIPTION OF THE DRAWINGS

Reference will now be made to the accompanying drawings, showing by way of illustration a preferred embodiment of the present invention and in which:

FIGS. 2a to 2C are schematic views of handles of a pair of scissors or forceps, showing its attachment to the coupler of the replaceable instrument mechanism of FIG. 1a;

FIGS. 3a to 3c are schematic views of handle of a thumb forceps, showing its attachment to the coupler of the replaceable instrument mechanism of FIG. 1a;

FIG. 6a is a schematic view of a drive mechanism of the replaceable instrument mechanism;

FIG. 6b is a schematic view of a four-bar mechanism comparable to the drive mechanism of FIG. 6a, showing links and revolute joints;

FIG. 6c is a schematic view of the four-bar mechanism, showing symbolic designations for the links and angles formed by the links;

FIG. 6d is a schematic view of the four-bar mechanism, showing free body diagrams of each link and the forces acting upon them;

FIG. 7 is an enlarged perspective view of a pulley assembly for transferring power from a base to the platform through a roll joint;

FIG. 8 is a front view of the pulley assembly of FIG. 7;

FIG. 9a is a schematic view of the pulley assembly of FIG. 7, showing the tendon path after a roll;

FIG. 9b is a schematic view of the pulley assembly of FIG. 7, showing possible rotation of the drive pulley if the tendon path is held at one end;

FIG. 10a is a bottom schematic view of the pulley assembly of FIG. 7, showing the tendon path crossing over between idler pulleys;

FIG. 10b is a schematic view of a mechanism of the pulley assembly of FIG. 7 for allowing two tendons to cross over;

FIG. 10c is a bottom schematic view of an alternative embodiment of the pulley assembly, showing a tendon path that avoids crossing over between idler pulleys;

FIG. 10d is a top schematic view of the pulley assembly of FIG. 10c, showing a tendon path that avoids crossing over between idler pulleys;

FIG. 11a is a schematic view of a mechanism with revolute jointed handles connected directly to the drive pulley;

FIG. 11b is a schematic view of a mechanism with a fixed handle connected fixedly to the fixed coupler, and another mechanism with a plunger;

FIG. 11c is a schematic view of a mechanism with a plunger;

DESCRIPTION OF THE PREFERRED EMBODIMENTS

The illustrated embodiments show haptic devices in the form of serial controllers, with a serial mechanism supporting a replaceable instrument mechanism. The replaceable instrument mechanism may include motors which are generally lightweight. The controller preferably has a balanced design, which permits the motors to apply all their power to the handle mechanism, rather than consuming energy to overcome an unbalanced gravitational load. This leaves the natural weight of the instrument itself, allowing a realistic simulation of instruments that may include surgical instruments. The embodiments illustrate a replaceable instrument mechanism, permitting the user to change handles to maintain a feel for a variety of scissors and scissors-like instruments.

The hand controllers used in connection with computers allow for a user to move the handle mechanism of the instrument to activate, for example, a virtual forceps in a synchronous motion. The hand controllers preferably produce a feedback force on the instrument to be reflected to the user's hand when the virtual forceps comes into contact with an obstacle.

Figure 1A:
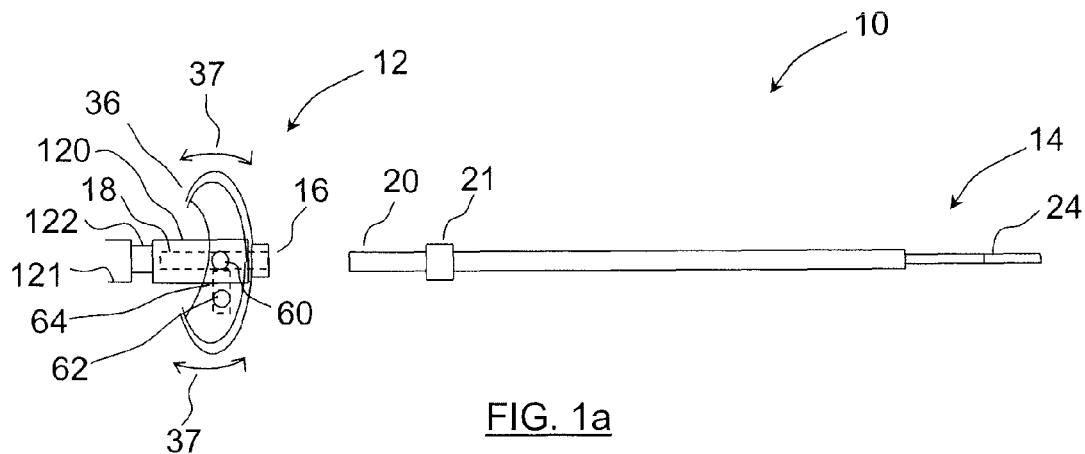
FIGS. 1a to 1c are schematic views of handles of an instrument known to surgeons as a rongeur, showing its attachment to a coupler of a replaceable instrument mechanism in accordance with an embodiment of the present invention.
Figure 1B:
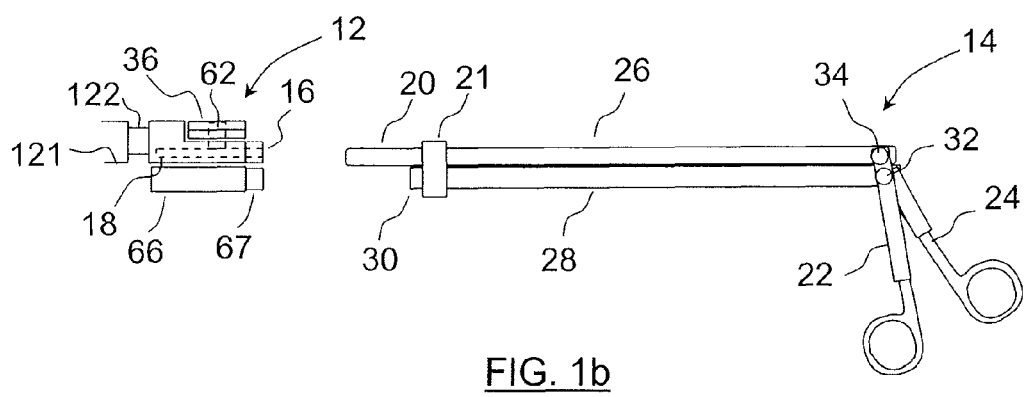
Figure 1C:
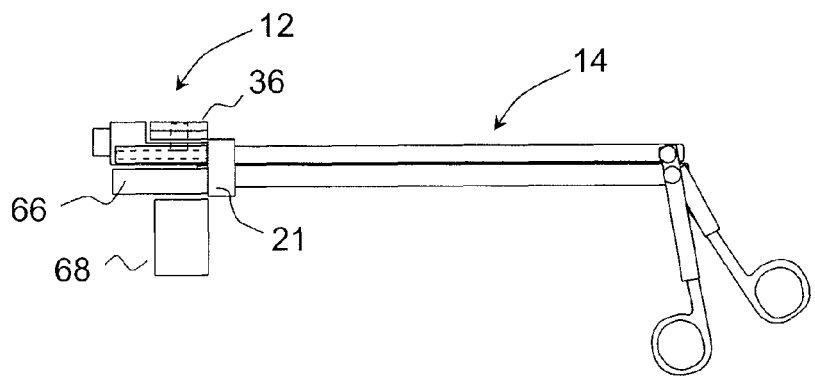

Rongeur and Coupler. Referring to FIGS. 1a to 1c, a replaceable instrument mechanism for haptic interface according to an embodiment is generally shown at 10. The mechanism 10 generally consists of an instrument with a coupler 12, the coupler 12 being the interface between the hand controller. A top view of a rongeur 14 is shown in FIG. 1a, the rongeur 14 being one variety of the replaceable instrument. In FIGS. 1b and 1c, a side view of the rongeur 14 of the replaceable instrument mechanism is generally shown, again in combination with a coupler 12.

The rongeur scissors 14 consists of a forward handle 22, a back handle 24, a sliding shaft 26, and a fixed shaft 28. The sliding shaft 26 is joined to the fixed shaft 28 by a prismatic joint, generally shown as 21 that binds the two shafts together, but allows them to slide relative to each other.

The fixed shaft 28 has a first end 30 (i.e., connector end) designed to fasten to a matching fixed shaft coupler 66 (an end of the coupler body) in the coupler 12. Its second end is fixedly attached to the back handle 24.

The sliding shaft 26 is a member relating the handle portion of the instrument 14 to the coupler 12 to transmit an actuation. The sliding shaft 26 has a first end 20 and a second end. Its first end 20 is designed to fasten to a matching sliding shaft coupler 16 in the coupler 12. Its second end is attached by a revolute joint 34 to the forward handle 22. A second revolute joint 32 attaches the forward handle 22 to the second end of the fixed shaft 28, in such a way that pulling the forward handle 22 toward the back handle 24 results in the sliding shaft 26 sliding forward relative to the fixed shaft 28. Accordingly, a scissors-like motion of the handles 22 and 24 will result in a reciprocating translational motion of the shaft 26 with respect to the shaft 28.

Figure 4A:
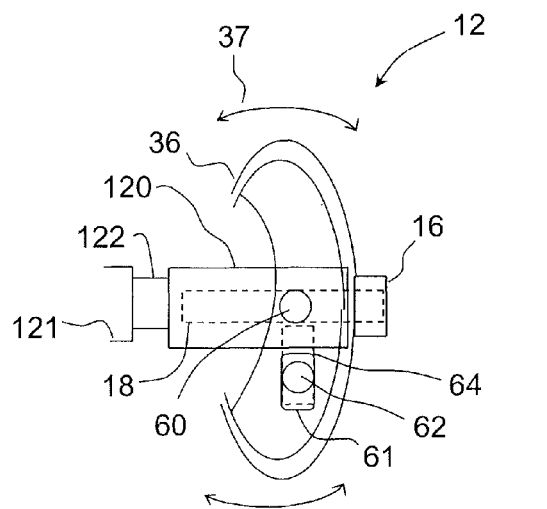
FIGS. 4a and 4b are enlarged views of the coupler of the replaceable instrument mechanism, showing coupling for fixed and sliding shafts.
Figure 4C:
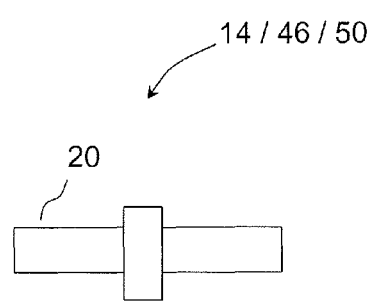
FIGS. 4c and 4d are enlarged views of coupling ends of instruments connectable to the coupler, showing fixed and sliding shafts.

The coupler, generally shown at 12, and in a more detailed view in FIG. 4a, has a coupler body secured to an output end of the hand controller and a force transmission mechanism to transmit forces between the hand controller and the instrument 14. The coupler body has the fixed shaft coupler 66, whereas the force transmission mechanism has the drive pulley 36, and the slider 18. The drive pulley 36 is connected by a revolute joint 60 at its centre to a platform 120 of the coupler body. The slider 18 is joined by a prismatic joint to the platform 120. Likewise, the fixed shaft coupler 66 is fixedly attached to the platform 120. The platform 120 is connected by a revolute roll joint 122 to a five-degree-of-freedom platform 121 representing the output end of the hand controller.

Referring to FIGS. 1a to 1c and 4a to 4d, the slider 18 has an end 16 and a side extension 64. The slider end 16 has a sliding shaft coupler, into which the end 20 of the sliding shaft 26 of the scissors can be inserted and locked into place. The extension 64 has a first end and a second end. Its first end is fixedly attached to the side of the slider 18. Its second end is attached to the drive pulley 36 by a prismatic-revolute joint 62, at a non-zero distance from the centre revolute joint 60 of the drive pulley 36. The prismatic revolute joint 62 allows both rotation and sliding in a radial slot 37 made along a radius of the drive pulley 36. Thus, when the pulley 36 turns, the slider 18 moves in its prismatic joint relative to the platform 120. Likewise, when the slider 18 moves relative to the platform 120, the pulley 36 turns. At the same time, the extension 64 moves relative to the drive pulley 36, both rotating about joint 62 and moving in slot 61, since the distance of joint 62 from the revolute joint 60 at the centre of the pulley 36 varies as the pulley 36 rotates about its centre.

Those skilled in the art will recognize that the slot 61 would be unnecessary if the prismatic joint 21 on the removable scissors 14 enabled the slider 26 to separate from the fixed shaft 28, moving in this case laterally as the drive pulley 36 rotates. Then joint 62 would be a purely revolute joint.

Figure 4B:
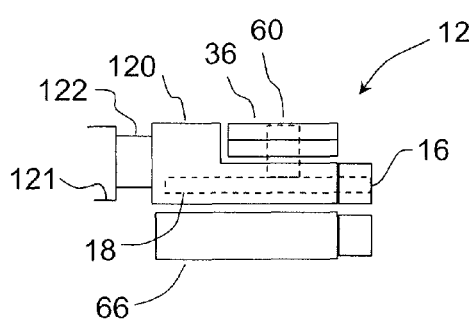
Figure 4D:
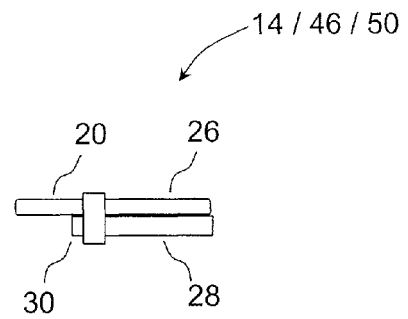

Referring to FIGS. 1b and 4b, the fixed shaft coupler 66 has an end 67, into which the end 30 of the fixed shaft 28 of the instrument can be inserted and locked into place. Thus when both the slider shaft 26 is locked into the slider 18 and the fixed shaft 28 is locked into the fixed coupler 66, as in FIG. 1c, the sliding motion of the sliding shaft 26 relative to the fixed shaft 28 is conveyed to the sliding motion of the slider 18 relative to the platform 120. This in turn is conveyed to a rotation of the drive pulley 36 about the revolute joint 60, as explained previously. Additionally, the sliding motion of the sliding shaft 26 relative to the fixed shaft 28 is activated by the motion of the forward handle 22 relative to the back handle 24. Thus relative motion of these handles 22 and 24 is matched to a rotation of the drive pulley 36.

Referring to FIG. 1c, rotation of the drive shaft pulley 36 is measured by an angular sensor 68. In the exemplary embodiment, the angle sensors are contactless magneto-restrictive sensors that offer a minimum of rotational friction. By sensing near the handle, the hand controller has maximum stability when the computer program simulates contact with a virtual rigid body.

Figure 2A:
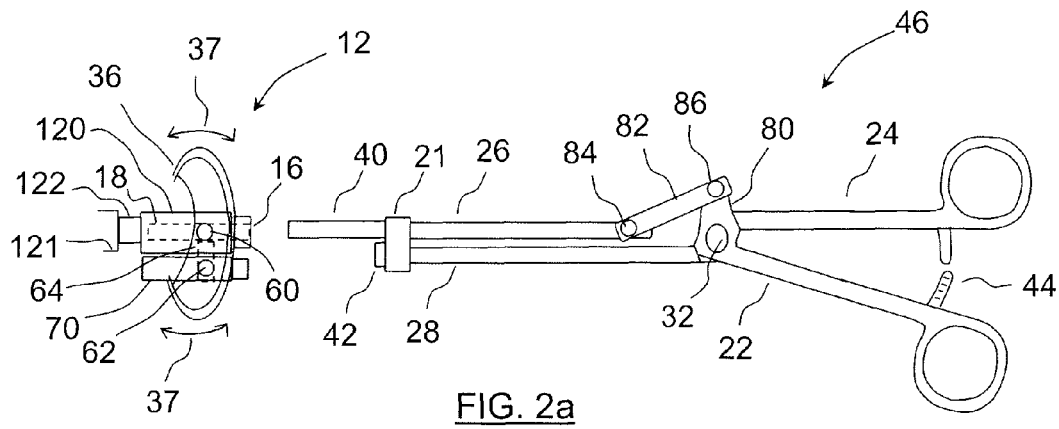
Figure 2B:
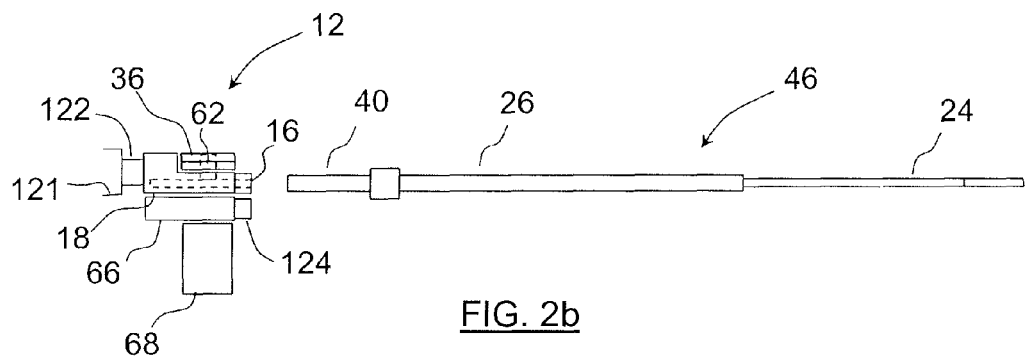
Figure 2C:
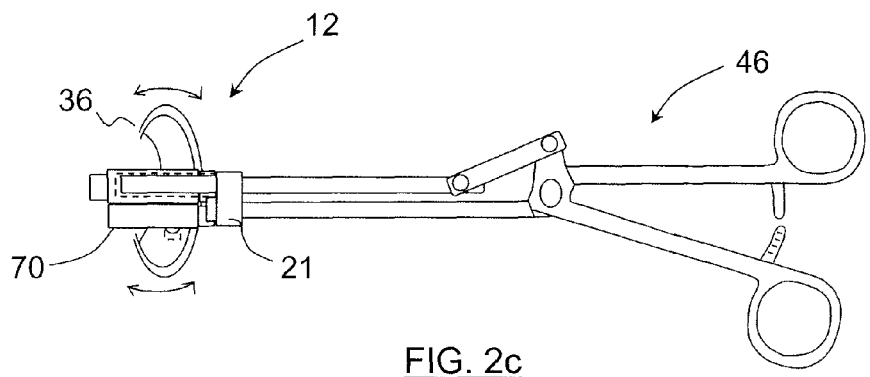

Mosquito Forceps and Coupler. Other types of instruments may be connected by similar means to the coupler 12 of FIGS. 4a and 4b. FIGS. 2a to 2c show a pair of mosquito forceps 46. Like the rongeur 14, the forceps 46 have a fixed shaft 28, a sliding shaft 26, a fixed handle 24 and a moveable handle 22. Unlike the rongeur 14, the forceps 46 are shown oriented horizontally in the top view of FIG. 2a, whereas the rongeur 14 is oriented vertically in this view (FIG. 1a). Therefore, the sliding shaft 26 is on the same horizontal level as the fixed shaft 28, rather than being vertically above it, as in the rongeur 14. The forceps are therefore connected to the coupler 12 at right angles to the orientation of the rongeur 14.

The force transmission mechanism of the coupler 12 in FIGS. 2a to 2c has the drive pulley 36, the slider 18, and the vertical fixed shaft coupler 66, whereas the coupler body has a horizontal fixed shaft coupler 70. The vertical fixed shaft coupler 66 accepts the fixed shaft 28 of vertically oriented instruments such as the rongeur 14 (FIGS. 1a to 1c), while the horizontal fixed shaft coupler 70 is additionally provided to accept the fixed shaft 28 of horizontally oriented instruments such as the forceps 46. The sliding shaft coupler 16 therefore accepts the sliding shaft 26 of either vertically or horizontally aligned instruments.

The sliding shaft 26 is joined to the fixed shaft 28 by a prismatic joint, generally shown as a bracket 21 that binds the two shafts together, but allows them to slide relative to each other. The fixed shaft 28 has a first end 42 and a second end. Its first end 42 is designed to fasten to the matching fixed shaft coupler 70 in the coupler 12. Its second end is fixedly attached to the fixed handle 24. The sliding shaft 26 has a first end 40 and a second end. Its first end 40 is designed to fasten to a matching sliding shaft coupler 16 in the coupler 12 (FIGS. 4a and 4b). Its second end is attached by a revolute joint 84 to one end of link 82. The other end of the link 82 is attached by a revolute joint 86 to an extension 80 of the moveable handle 22. A second revolute joint 32 attaches the moveable handle 22 to the second end of the fixed shaft 28, in such a way that pulling the moveable handle 22 toward the fixed handle 24 results in the sliding shaft 26 sliding forward relative to the fixed shaft 28.

Referring to FIGS. 2a to 2c, in the case of the forceps shown at 46, a latch 44 is optionally provided that will latch the handles at one position, so that the handles may be squeezed more tightly together but cannot be pushed apart without releasing the latch.

Figure 3A:
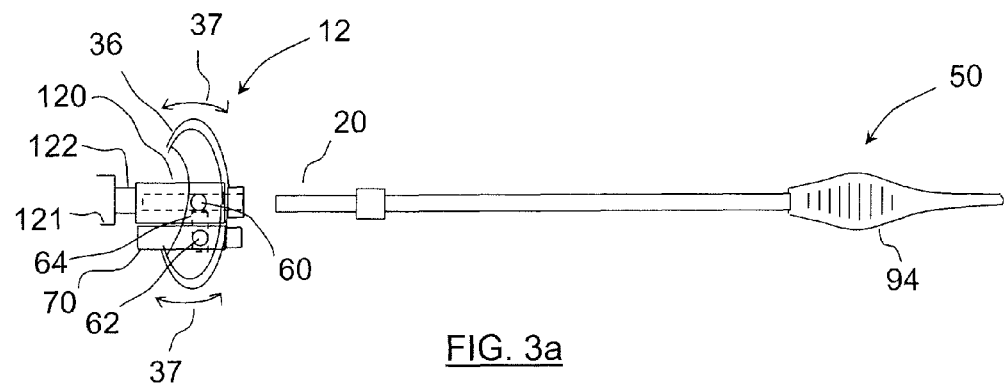
Figure 3B:
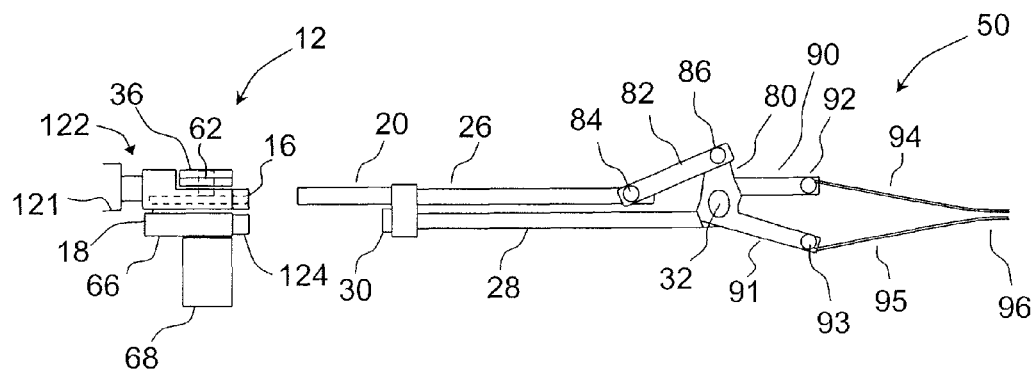
Figure 3C:
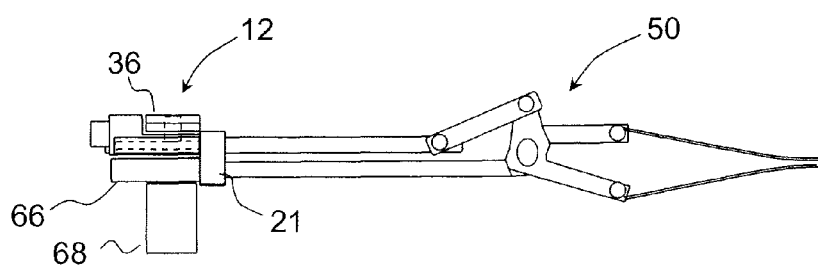

Thumb Forceps and Coupler. FIGS. 3a to 3c show a third exemplary instrument handle modified to allow attachment to the hand controller via the coupler 12 (FIGS. 4a and 4b). This is a thumb forceps, shown generally at 50. Like the rongeur 14 (FIGS. 1a to 1c), this device 50 has a fixed shaft 28, a sliding shaft 26, a fixed handle stub 90 and a moveable handle stub 91. The thumb forceps 50 is therefore connected to the coupler 12 in the same orientation as the rongeur 14, with end 20 of sliding shaft 26 mating with coupler 16, and end 30 of fixed shaft 28 mating with coupler 66 (FIGS. 4a and 4b).

The thumb forceps 50 consists of a top leaf 94 and a bottom leaf 95. The two leaves are made of spring material, so that if they are bent they tend to return to their original shape in elastic fashion. The top leaf 94 has a first end and a second end. Likewise, the bottom leaf 95 has a first end and a second end. The first ends of both pieces are bent to the outside, so the first end of the top leaf 94 is bent upward, while the first end of the bottom leaf 95 is bent downward. The first end of the top leaf 94 is fixedly attached to the first end of the bottom leaf 95 at junction 96, so that if a user squeezes the second ends together using the thumb and forefinger, they will offer some resistance and push back on the user's thumb and forefinger.

The second end of the top leaf 94 is attached by a rotary joint 92 to the fixed handle stub 90. The fixed handle stub 90 is fixedly attached to one end of the fixed shaft 28. The second end of the bottom leaf 95 is attached by a rotary joint 93 to the moveable handle stub 91.

The sliding shaft 26 has the first end 40 and a second end. Its first end 40 is designed to fasten to a matching sliding shaft coupler 16 in the coupler 12, as has been described previously (FIGS. 4a and 4b). Its second end is attached by a revolute joint 84 to one end of link 82. The other end of the link 82 is attached by a revolute joint 86 to an extension 80 of the moveable handle stub 91. A second revolute joint 32 attaches the moveable handle stub 91 to the second end of the fixed shaft 28 via link 82, in such a way that moving the moveable handle stub 91 toward the fixed handle stub 90 results in the sliding shaft 26 sliding forward relative to the fixed shaft 28.

Because of the attachment of the second end of the bottom and top leaves 94 and 95 to the fixed and moveable handle stubs 90 and 91, respectively, then squeezing the second ends of the leaves 94 and 95 together will result in the moveable handle stub 91 being pulled toward the fixed handle stub 90, and thus the slider shaft 26 moving relative to the fixed slider shaft 28. When the thumb forceps 50 is docked into the coupler 12, then squeezing the leaves 94 and 95 of the thumb forceps 50 will result in rotation of the drive wheel 36. Likewise, rotation of the drive wheel 36 will result in the first ends of the leaves 94 and 95 of the thumb forceps 50 being moved apart or toward one another.

Figure 5A:
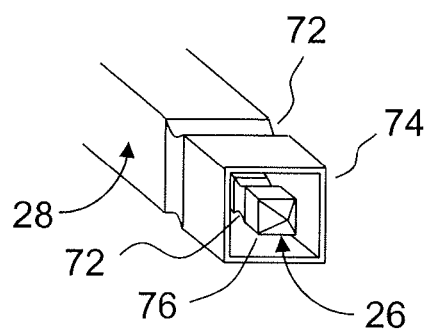
FIG. 5a is a perspective schematic view of a coupling mechanism, with a slider shaft contained inside a fixed shaft.

Alternative Coupling Mechanisms. The coupling between the instruments, shown generally at 14/46/50 in FIGS. 4c and 4d, may be made in different ways. FIG. 5a shows a central slider 76 inside a fixed outer casing 74. The alternative coupling is symmetric in rotation, including the latch notch 72. The fixed couplers 66 and 70 of the coupler 12 (FIGS. 4a and 4b) would then be replaced by a single coupler arranged around the slider coupler 16 (which receives the slider 76) and designed to accept the fixed outer casing 74.

Figure 5B:
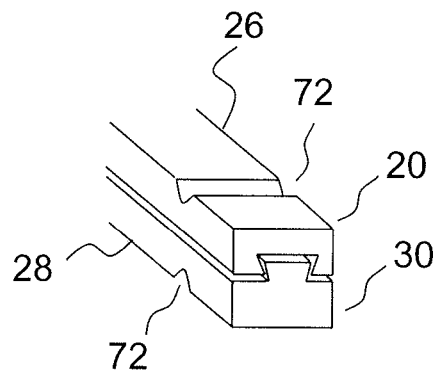
FIG. 5b is a perspective schematic view of an alternative coupling mechanism, with a slider shaft on top of a fixed shaft.

FIG. 5b shows the end 20 of the sliding shaft 26 and the end 30 of the fixed shaft 28. The shape of the prismatic joint 21 between the shafts 26 and 28 ensures that they will not easily pry apart, while moving with respect to the joint 21.

Figure 5C:
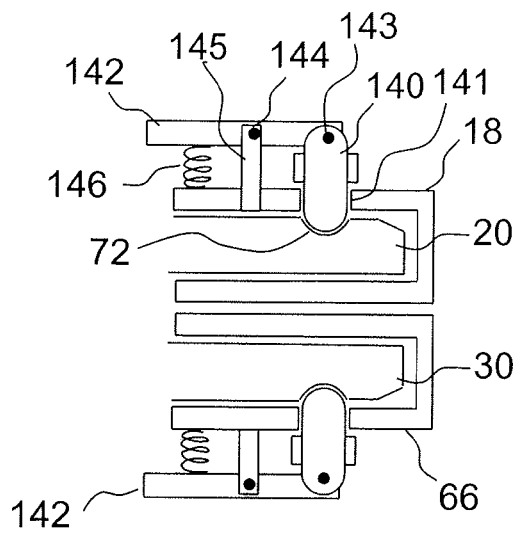
FIG. 5c is a schematic assembly view of a latching mechanism for securing the sliding shaft and the fixed shaft into place.

In both FIG. 5a and FIG. 5b, the notch 72 may be seen in the sliding shaft 26 and in the fixed shaft. FIG. 5c shows an exemplary mechanism for latching the shaft ends 20 and 30 into place in the coupler 12. Sliding shaft end 20 is inserted into sliding coupler 18, and fixed shaft end 30 is inserted into fixed coupler 66. As mentioned previously, both the sliding shaft end 20 and the fixed shaft end 30 have the notches 72.

Exemplary details are given for the sliding shaft coupling. A plunger 140 fits into the notch 72 of the sliding shaft end 20. The plunger has a first end and a second end. The first end of the plunger passes through a hole 141 in the wall of the coupler 18. It is shaped so that it will not fall completely through the hole 141. When the sliding shaft end 20 is removed, the first end of the plunger 140 goes into the cavity left by the shaft. When the sliding shaft end 20 is reinserted, its slanted shape pushes the plunger 140 upward.

A similar mechanism would hold for the inside slider 76/outside shell 74 mechanism. In this case, the inside slider 76 would project further into the receiving coupler 12, so that the latch could be set onto the inside slider 76 and outside slider 74 at different locations in the receiving coupler 12. Alternately, an elongated hole could be provided in the outside case 74 by which a narrower plunger 140 could penetrate through the outside shell and latch onto the inside slider 76, but still permit the slider to move linearly in its prismatic joint 21.

A flat plate 142, seen from the side in FIG. 5c, is joined at its centre to a support 145 by a revolute joint 144. The support 145 is fixedly attached to the sliding coupler 18. The flat plate 142 has a first end and a second end. The first end is attached by a revolute joint 143 to the second end of the plunger 140. The second end of the plate 142 is pushed upward by a spring 146. Thus the flat plate 142 acts as a lever, pushing the plunger 140 into the hole 141 and securing the sliding shaft end 20 in place by pressing into the notch 72.

A similar device secures the fixed shaft end 30. When a user wants to remove the removable scissors or like instrument, pressure is applied manually on the second ends of both plates 142, thereby pulling the plungers out of their positions and releasing the shaft ends 20 and 30.

Means for Imparting Force to the Scissors. An example of means for imparting force to the removable scissors is shown in FIG. 6a. A rotary motor 101 has a capstan 100 attached to its output shaft. A tendon 102 connects the capstan 100 to the drive pulley 36. The tendon 102 may pass over numerous idlers, although not shown. The capstan 100 has a radius r1, and the drive pulley 36 has a radius r2.

If the motor exerts a torque $\tau 1$, then the tendon 102 has a tension $F1=\tau 1/r1$. The outside of the pulley 36 at radius r2 is therefore pulled with a force F1, giving a torque $\tau 2=r2 \times F1$. The torque r2 is different from the original motor torque $\tau 1$ by a factor r2/r1, since $\tau 2=(r2/r1) \times \tau 1$ by substitution of the first equation for F1 into the second equation for $\tau 2$. In an exemplary case, the capstan 100 has a radius of 5 mm, and the drive pulley 36 has a radius of 20 mm, so the torque at the drive pulley 36 is four times the torque at the motor capstan 100.

The relation between the instrument (e.g., rongeur 14, forceps 46/50) and the coupler 12 is for all these instruments, but will be described with respect to the rongeur 14 by way of an example to simplify the description. Referring to FIGS. 6a and 6b, the drive pulley 36 is connected to the moveable scissors handle 22 by the sliding shaft 26. The fixed shaft 28 supports the fixed scissors handle 24. The handles are joined at a revolute joint 32, represented symbolically at the center of a solid disk 104 in FIG. 6a. In this representation, the moveable handle 22 is fixedly attached to the solid disk 104, so that when the handle 22 moves, the disk 104 rotates about its center 32. As described above, the first end of the sliding shaft 26 is connected to the drive pulley 36 by the revolute joint 60, and the second end of the sliding shaft 26 is connected to the solid disk 104 by a revolute joint 34. The distance between joint 34 and the disk centre joint 32 is a radius r4. The distance between the centre of the ring of the handle 22 and the disk centre joint 32 is a radius r5.

The distance between the revolute joint 60 and the drive pulley 36 centre is a radius r3. The drive pulley 36 has a radius r2.

The shafts 26 and 28, the drive pulley 36 and the solid disk 104 form a four-bar mechanism. It is redrawn in FIG. 6b to emphasize its four-bar design, and again in FIG. 6c to mark the corresponding links with symbols. The four-bar is shown as a parallelogram with corners A, B, C and D, but the equations can be generalized to unequal link lengths. The radii r2, r3, r4 and r5 are marked on the diagram. Radius r5 is shown going upward from joint 32 through joint 34, as if the moveable handle 22 were on the other side of the device from its location in FIG. 6a. The two positions are equivalent, since the handle is fixedly attached to the assumed disk 104, and the angle of attachment is of no consequence as far as the kinematics are concerned.

The parallel four-bar has four links. Link a1 is the frame link, and is assumed to be grounded, or fixedly attached to the earth. This corresponds to the fixed shaft 28 of the replaceable instrument. Link a2 is the input link, with the length r3 between joints 60 and 62 link a4 is the output link, with length r4 between joints 32 and 34. Link a3 is the connecting link, corresponding to the sliding shaft 26. Angle ψ between link a1 and link a2 is the input angle. Angle α between link a2 and link a3 is the connecting angle. Angle β between link a3 and link a4 is the transmission angle. Angle φ between link a4 and link a1 is the output angle.

The analysis is made by considering each moveable link as a free body. FIG. 6d shows the forces acting on the input link a2, the connecting link a3 and the output link a4. Force F is at right angles to link a2, since it originates in a tendon wrapped around the pulley and emerging tangentially to its circumference. To emphasize this, it is marked $F_\perp$ on the diagram. In addition, any force component parallel to the link would not cause a movement, since such movement is constrained by the revolute joint 60 at end A of the link a2. Similarly, the output force is taken as component $F_\perp'$ normal to the output link a4. The force $F_\perp'$ is shown acting on the link, as required by free body analysis.

Connecting link a3 has two forces acting on it, +Fc at the left end, and −Fc at the right end (taking the right direction to be positive, and the left direction to be negative). The forces are equal, because the link is in static equilibrium, moving neither to the right nor to the left. There are no force components normal to the link, because the link is in static equilibrium, and does not rotate clockwise or anti-clockwise. So the two forces, +Fc and −Fc, are equal and directed along the link.

Consider the input link a2 as a free body. Force $F_\perp$ pushes from the left at a distance r2 from point A (the revolute joint between the input link a2 and the frame link a1). Force $F_c$ from the link pushes from the right, and a reaction force $F_A$ pushes from point A. The torque around point A must add to zero, so taking a sum of torque about A, $$r_2 F_\perp - r_3 F_c \sin\alpha = 0$$

The term r3 sin α takes into account the lever arm of the force Fc from the connecting rod. In the same way, the torque about point D on the output link a4 must add up to zero. The external force F' pushes back on the link, giving it a negative direction, while force Fc pushes from the left.

$$-r_5 F_\perp' + r_4 F_c \sin\beta = 0$$

Combining the equations to eliminate the connecting link force Fc, we find $$F_\perp' = \frac{F_\perp \cdot r2 \cdot r4 \cdot \sin\beta}{r3 \cdot r5 \cdot \sin\alpha}$$

This may be related to the motor torque by inserting $F_\perp = \tau/r1$ from an earlier analysis of the pulley system, to give, $$F_\perp' = \frac{\tau 1 \cdot r2 \cdot r4 \cdot \sin\beta}{r1 \cdot r3 \cdot r5 \cdot \sin\alpha}$$

In the special case of a parallelogram r2=r3=r4=r5, and sin β=sin(π−α)=sin α, and $F_\perp'=F_\perp$. The output force from a parallel four-bar is equal to the input force. For other configurations, the equation holds, and the links can be configured to set the desired force on the scissors. Thus a correct choice of radii r2, r3, r4 and r5 gives the optimal force and angular range of motion for simulation forces felt at the scissors handles while executing cutting or clamping procedures.

One restriction that is placed on a four-bar assembly is that the connecting angle α and the transmission angle β should not be less than 45°. Below these angles, coupling of motion through the connecting link is inefficient, and the four-bar can lock up, with either the output or the input link unable to move. This restricts the linear motion of the slider to the distance between the ends of an arc described by a point on the pulley at a given radius r, while the pulley rotates between ψ=45° and ψ=45°+90°. This distance is given by 2 r sin 45°=r√2. If 5 mm of motion the sliding shaft is desired, then the radii r3 and r4 are approximately 3 mm or more.

In our exemplary case, we have τ1=50 mN·m, r1=5 mm, r2=20 mm, r3=3 mm, r4=10 mm, r5=40 mm, and we assume sin β=sin α, giving $F_\perp'$=17 N. This is comparable to the standard male gripping strength of 50 N. The torque is quoted for a 10 W Maxon RE025 motor. Larger motors would give greater torque.

The replaceable instrument mechanism generally shown at 10 is mounted on a moveable platform. As described previously, the coupler, generally shown at 12 in FIGS. 1a to 4b, has the drive pulley 36, and the slider 18 as part of the force transmission mechanism, and the fixed shaft coupler 66 has part of the coupler body. The drive pulley 36 is connected by the revolute joint 60 at its centre to the platform 120. The slider 18 is joined by a prismatic joint to the platform 120. Likewise, the fixed shaft coupler 66 is fixedly attached to the platform 120. The platform 120 is connected by the revolute roll joint 122 to the platform 121, which is part of the haptic device.

FIG. 7 shows an isometric view of a pulley assembly 123 allowing to route the tendon 102 from the platform 121 over the roll joint 122 to the drive pulley 36. FIG. 10a shows another view of the pulley assembly 123. Seven pulleys are provided to make the transfer. The pulleys are configured so that turning the platform 120 in roll around axis 124 relative to the moveable platform 121 will not result in a change to the overall length of the tendon 102. The pulley set consists of a large pulley 112 generally in the same plane as the drive pulley 36 when the roll joint 122 is in its home position, as shown in FIG. 7. An inner set of roll idlers 114 and 115, an outer set of roll idlers 116 and 117, and a set of crossover idlers 130 and 132 complete the pulley assembly 123.

The axes of rotation of idlers 114 and 115 are generally orthogonal to the axis of rotation 125 of the large pulley 112, and to the roll axis 124. Likewise, the axes of rotation of idlers 116 and 117 are generally orthogonal to the axis of rotation 126 of the scissors pulley 36, and to the roll axis 124.

Reference will now generally be made to left-side parts and right-side parts, as shown in FIG. 7. It is pointed out that FIG. 10a is a view from the underside of the assembly 123, so right and left are reversed in this view when compared to FIG. 7.

The tendon 102 has a left tendon half 106 and a right tendon half 108. The left tendon half 106 is routed by a one-quarter turn around the large pulley 112, over the left inner roll idler 114, under the left crossover idler 130 (FIG. 10a), back up over the right outer idler 117, and around the right side of the drive pulley 36. From the left side of the drive pulley 36, the tendon right half 108 is routed over the left outer idler 116, under the right crossover idler 132 (FIG. 10a), over the right inner idler 115, and by a three-quarter turn around the large pulley 112. The idlers are arranged so that the tendon 102 arrives at each pulley in a direction tangential to the surface of the pulley, and generally in the plane of the pulley.

FIG. 8 shows a view of the assembly along the roll axis 124 from the direction of the instrument. The platform 120 is shown in a position rolled about 45° counterclockwise from the home position. The tendon 102 can be seen routed around idlers 112, 114, 115, 116 and 117, and the drive pulley 36. Idlers 116 and 117, and the drive pulley 36 are shown rotated in roll about axis 124, since they are attached to the platform 120. Idlers 112, 114 and 115 are shown in the same position as in FIG. 7, since they are attached to the moveable platform 121.

FIG. 9a shows the tendon path in stylized form. The large idler 112 is stationary in this frame, and the drive pulley 36, being mounted on the platform 120, is shown rotated in roll.

FIG. 9b shows the overall tendon path as a continuous loop from the right side of the large pulley 112, around the roll joint 122, around the drive pulley 36, around the roll joint 122 again, and back to the left side of the large pulley 112. The drive pulley 36 has an axis of rotation 126 that is normal to the roll axis 124. If the tendon ends at the large pulley 112 are held, then rotating the platform 120 about the roll axis 124 will result in rotation of the drive pulley 36 about its axis 126.

On the other hand, holding the drive pulley 36 from rotating about its axis 126 will result in movement of the tendon 102 about the large pulley 112. Therefore the entire path of tendon 102 over its idler pulleys 112, 114, 115, 116, 117, 130, 132 and other idlers not shown along the tendon path between the capstan 100 and the large pulley 112, must have low friction. In addition, the motor 101 and all pulleys and idlers must have low inertia. To the extent that these conditions are not met, the instrument will tend to open or close as the platform 120 is rotated about the roll axis 122.

In the exemplary system, care has been taken to ensure that all idlers have low friction, and that the motor 101 and all pulleys and idlers have low inertia. For example, friction in the roll joint without the instrument (but with tendon 102, together with the motor 101 and the guide pulleys along the path between the roll joint and the motor) is under 5 mN·m of torque.

The crossover pulleys 130 and 132 are shown in FIG. 10b. In this exemplary embodiment, left crossover pulley 130 is an open-frame pulley, while the right crossover pulley 132 is a closed-frame pulley. In the assembly, the right crossover pulley 132 is mounted inside the open-frame left crossover pulley 130. The left tendon half 106 (FIG. 10a) is routed under the left crossover idler 130, while the right tendon half 108 (FIG. 10a) is routed under the right crossover idler 132 and through the centre of the left crossover idler 130. Thus, the tendon halves 106 and 108 can cross over under the roll joint 122 without touching each other.

It is possible to route the tendons so that no crossover is necessary. FIG. 10c shows an alternative configuration of the pulley assembly 123 from a similar viewpoint as for FIG. 10a, while FIG. 10d shows the alternative tendon routing from a similar viewpoint as for FIG. 7. Thus FIG. 10a and FIG. 10c show alternative configurations of the pulley assembly 123.

In the alternative configuration, the crossover pulleys 130 and 132 are replaced by a single roll idler 180 with an axis of rotation coincident with the roll axis 124. As in FIG. 10a, the axes of rotation of idlers 114 and 115 are generally orthogonal to the axis of rotation of the large pulley 112, and to the roll axis 124. Unlike FIG. 10a, however, the axes of rotation of idlers 116 and 117 are generally parallel to the axis of rotation 126 of the drive pulley 36, and orthogonal to the roll axis 124. This does not change the consideration of the independence of the scissors angle opening of the roll angle, as discussed in conjunction with FIGS. 9a and 9b.

The left half 106 of tendon 102 is routed by a one-quarter turn around the large pulley 112, over the left inner roll idler 114, then under the single roll idler 180, across its top surface and onto left outer idler 116, thence around the left side of the drive pulley 36. From the right side of the drive pulley 36, the tendon half 108 is routed around the right outer idler 117, across and under the single roll idler 180, then up over the right inner idler 115, and by a three-quarter turn around the large idler 112.

From the point of view of distance along the roll axis 124, the left outer idler 116 is placed closer to the large idler 112 than the right outer idler 117. Similarly, the left inner idler 114 is placed closer to the large idler 112 than the right inner idler 115. The tendon half 106 is fed from the left inner idler 114 around the roll idler 180 to the left outer idler 116. Similarly, the tendon half 108 is fed from the right inner idler 115 around the roll idler 180 to the right outer idler 117. Because the left idlers 114 and 116 are closer to the large idler 112 than the right idlers 115 and 117, the wrapping of the left tendon 106 around the roll idler 180 is closer to the large idler 112 than the wrapping of the right tendon 108. Thus, the two wrappings are separated. In this way, the tendon paths wind in a helical fashion about the roll idler 180, but do not touch each other.

Moreover, to ensure free rotation of the platform 120 about roll joint 122, the left outer idler 116, although it is closer to the large idler 112 than the right outer idler 117, it must be farther from the large idler 112 than the right inner idler 115. On rotation clockwise about roll axis 124, tendon 106 eventually touches tendon 108, preventing further rotation. The same is true of counterclockwise rotation. The interference between strings is estimated to occur at 125° clockwise rotation, or 235° counterclockwise rotation. If the idlers were not separated in the manner just described, idlers 115 and 116 themselves would touch upon rotation of the platform 120 about the roll axis 124. This would give a more restricted range of roll angles, since idlers 115 and 116 subtend a larger angle in roll than the narrow tendons.

We note that the tendon routing configuration 123 shown in FIG. 10a also has a restricted range of roll, since tendon 108 passing through the inner idler 132 would touch the inside surface of the outer idler 130 if platform 120 is rotated counterclockwise by less than 90°. If platform 120 is rotated counterclockwise by 180°, then tendon 106 would become disengaged from its idlers. For this reason, the alternative tendon routing shown in FIGS. 10c and 10d offers a wider range of rotation of the platform 120 about the roll axis 124.

It would be clear to those conversant with the art that the description of the mechanism in terms of "right" and "left" do not preclude the possibility of interchanging the left and right sides of the assembly.

The mechanism 10 described above presents several advantages. Various types of instruments can be attached to the coupler and removed, so that the operator feels the shape and texture of each instrument in ways reminiscent of the corresponding instrument as it is used in surgery.

Because in a preferred embodiment the removable instrument is mounted on the sixth joint of a six-degree-of-freedom hand controller, a high degree of movement is permitted. In this way, many different surgical procedures can be duplicated, with the instrument oriented in the hand of the surgeon in ways appropriate for each surgical procedure.

In the exemplary case of the hand controller, the device is counterbalanced, so that the only weight that the surgeon feels is the weight of the instrument itself. Because of the counterweights, the five-degree-of-freedom moveable platform 121 is balanced in a gravitational field. Accordingly, the coupler 12 maintains any position without assistance when no motion is transmitted by the instrument. This reduces the load on the motors, which can put their energy into positioning rather than holding a position.

Figure 13:
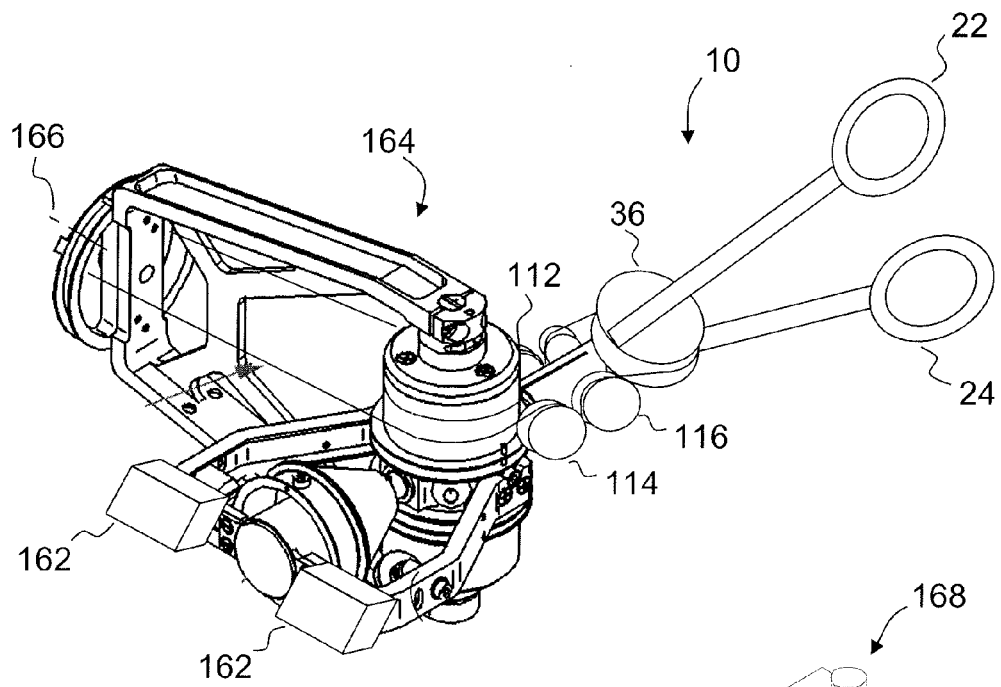
FIG. 13 is a perspective view of the distal stage of a Freedom 6S hand controller with the replaceable instrument mechanism of the present invention.
Figure 14:
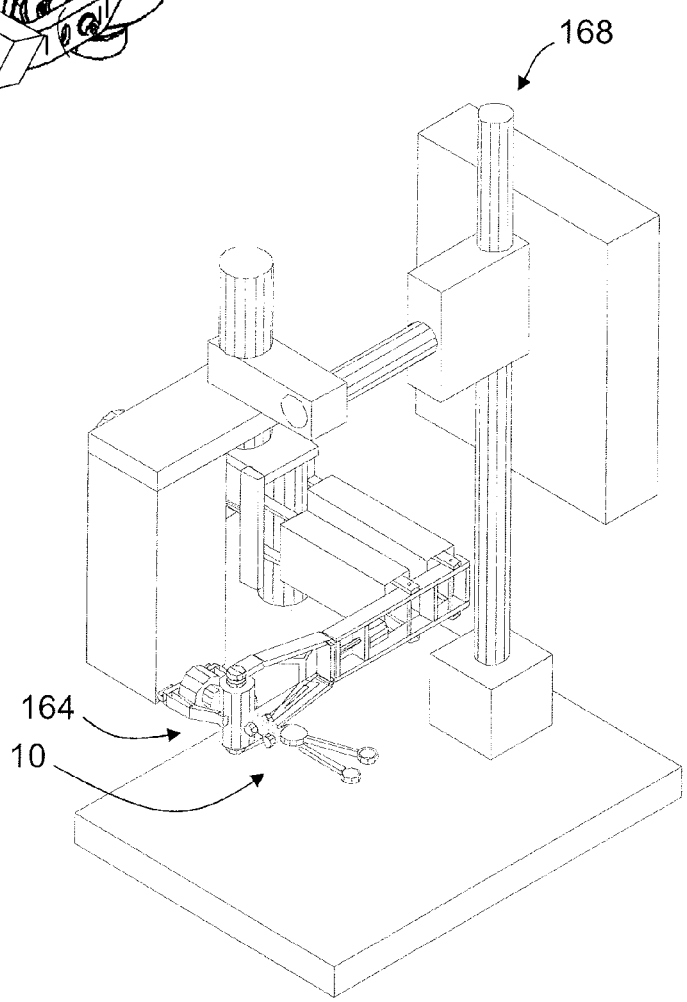
FIG. 14 is an overall perspective view the Freedom 6S hand controller with the replaceable instrument mechanism of FIG. 13.

Another embodiment of the moveable platform 121 is shown at 168 in FIG. 14. The instrument of the replaceable instruments mechanism 10 is shown in place in an apparatus 168, at the end of a balanced arm. The replaceable instrument mechanism 10 may itself be counterbalanced partially by the addition of counterweights 162 to the distal stage 164, as shown in FIG. 13. The counterweights 162 will serve to balance the weight of the replaceable mechanism 10 about the pitch axis 166 of the distal stage 164. The force transmission mechanism in this example has the pulley 36 mounted directly to the pivot of the scissors-like handle.

Figure 15:
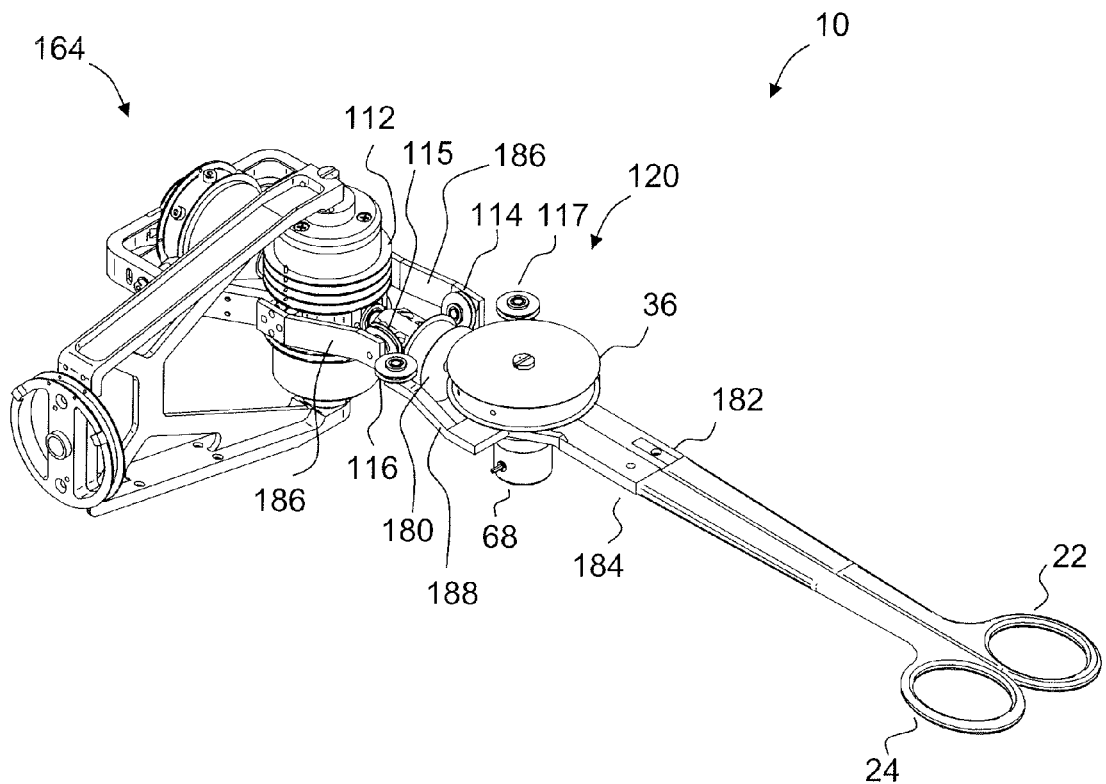
FIG. 15 is a perspective view of the distal stage of the Freedom 6S hand controller with an alternative embodiment of the replaceable instrument mechanism.

A further embodiment of the removeable instrument mechanism 10 is illustrated in FIG. 15. In this embodiment, idlers 114 and 115 are shown supported by brackets 186 fixedly attached to the distal stage 164. Similarly, idlers 116 and 117 are supported by brackets 188 fixedly attached to the platform 120. The large idler 112 may be seen in its location in the distal stage 164. Likewise, the drive pulley 36 is seen in its location in the platform 120. The fixed scissors handle 24 is fixedly attached to the platform 120, while the moveable scissors handle 22 is fixedly attached to the drive pulley 36, to rotate about a common axis. In this embodiment, the scissors handles 22 and 24 can each be detached and reattached from the assembly by couplings 182 and 184, respectively. These are prismatic joints that may be, for example, in the form of the dovetail joint shown in FIG. 5b.

Figure 16:
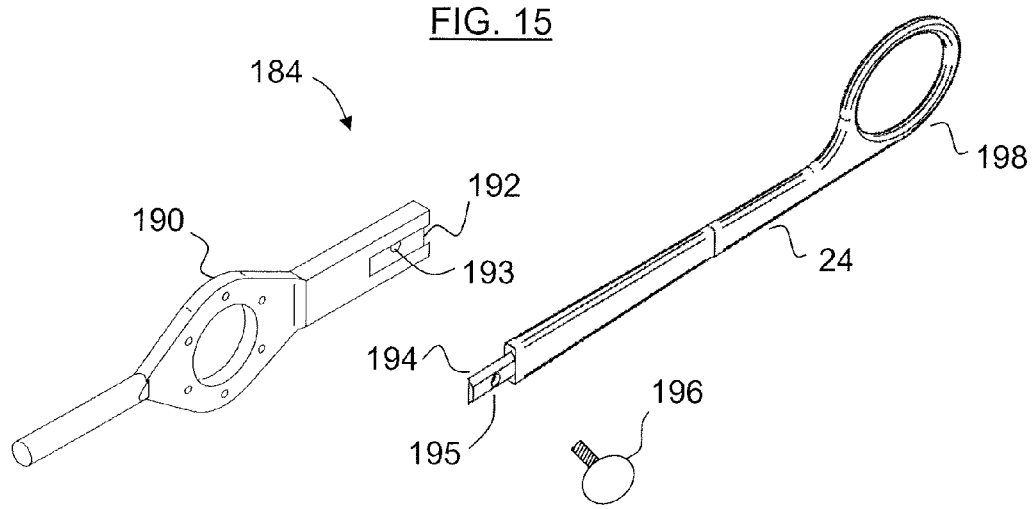
FIG. 16 is an exploded view of an instrument used in the replaceable instrument mechanism.

FIG. 16 shows the handle coupling in more detail. The handle 24 is fixedly attached to a member 190 by means of a dovetail joint 184. The member 190 has its body fixedly attached to the platform 120, and is formed into a receptacle half 192 of the dovetail joint 184.

The handle 24 has a first end and a second end. Its first end has a finger ring 198, into which a user may insert a finger. Its second end is formed into an insertion half 194 of the dovetail joint 184 that is complementary to the dovetail joint 192 in member 190, so that the ends 192 and 194 may be slid together by prismatic motion, so that the two form the complete joint 184. The joint 184 is further secured by a screw 196. A hole 193 with threads that match the screw 196 is made in the middle of end 192. A hole 195 through which the screw 196 passes is made in the middle of joint 194. The screw 196 is then inserted into the hole 195, and screwed into the threaded hole 193, thereby holding the dovetail joint 184 securely closed. One skilled in the art would recognize that the joint 184 could equally well have been secured in the opposite direction, with threads in hole 195 and hole 193 widened to allow the screw 196 to pass.

A rotational sensor 68 mounted in the coupler 12 permits the opening angle of the scissors to be determined from the rotational angle of the drive pulley 36. Since this angle is determined close to the hand of the user, there is minimal time lag in sensing the angle, as there would be if the angle sensor 68 were mounted near the drive capstan 100. This permits the simulation of contact with virtual rigid bodies.

Preloaded bearings in each joint, including the roll joint, the idler rotational joints, and the joints of the removable instruments, allow response with reduced backlash and a minimum of friction.

Alternative means for attachment of the instrument to the device are possible. FIG. 11a shows an exemplary embodiment with the handles 24 and 22 separately attached, with the fixed handle 24 plugged into the platform 120 and the moveable handle 22 attached directly to the drive pulley 36 by means of a temporary coupler, rather than attached by means of sliding member 18

In a second alternative embodiment shown in FIG. 11b, the fixed handle 24 alone is connected to the platform 120 by way of, for example, the vertical fixed shaft coupler 66 (FIGS. 4a and 4b) or the horizontal fixed shaft coupler 70, or even by way of the moveable shaft coupler 16. In this way, non-jointed handles of different types can be attached to the hand controller by way of the same coupling mechanism that is used to temporarily attach revolute jointed handle mechanisms.

Again alternatively, as shown in FIG. 11c, a handle that has only a prismatic joint, such as a plunger mechanism 170 operating in a casing 172, can be operated with sliding shaft 26 fixedly attached to the plunger 170, and fixed shaft 28 fixedly attached to the casing 172, and the assembly attached to the receiver on the platform 120 by way of the moveable shaft coupler 16 and one of the fixed shaft couplers 66 or 70, and both sensed in linear position and activated by way of the sensor 68 and the drive shaft 18. This could most conveniently be coupled using the inside slider/outside shell mechanism pictured at 74 and 76 in FIG. 5a.

By making use of a magneto-resistance effect angle sensor connected to a 16-bit analog to digital converter, the mechanism can deliver an angular resolution of some 7 seconds of arc over a 120 degree range of motion of the drive pulley 36, without the weight, size and expense penalties incurred by optical encoders. This angular range is well suited for the opening angle of a typical hand-held surgical instrument, where ranges of motion of only 20 degrees are common. Alternatively, a precise linear sensor sensing the movement of the sliding drive shaft 18 relative to the fixed coupler 66 or 70 could be used in the same way with a 16-bit analogue to digital converter.

Figure 12:
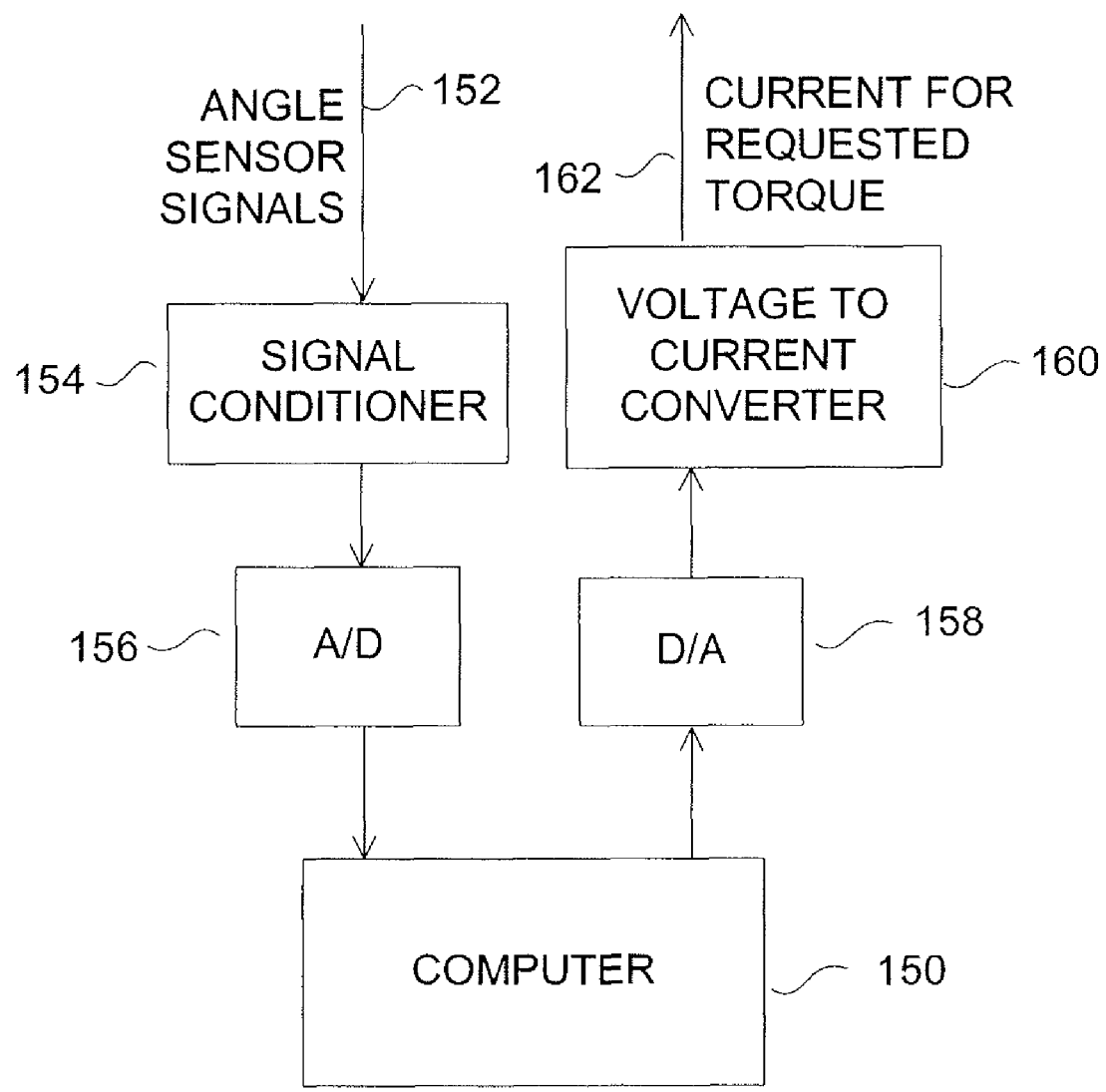
FIG. 12 is a schematic representation of a processing system used with the manipulator of FIG. 1.

FIG. 12 illustrates a processing system for coupling the hand controller device to a computer. The angle sensor signal 152 is conditioned to provide a clean signal of the instrument motion.

In operation, the user chooses the instrument from a set of choices, illustrated by 14, 46 and 50, and plugs the instrument into the haptic device through the coupler 12. The user then grasps the handles 22 and 24 of the instrument, and moves them toward or away from each other, while at the same time positioning the instrument with three translational degrees of freedom and three rotational degrees of freedom, according to a preferred embodiment. Movements of the moveable handle 22 relative to the fixed handle 24 are measured by the rotational sensor 68 attached to the drive pulley 36 on the platform 120.

In the processing system of FIG. 12, the voltages representing angle sensor signals 152 of the sensor 68, together with other angle sensors on the hand controller, are passed to a computer 150 through a signal conditioner 154 and an analogue to digital converter 156. In the signal conditioner 154, the signals 152 are amplified to the full voltage range of the A/D converter 156 and filtered with a 100 Hz low pass filter to remove noise.

In a preferred embodiment, a program in the computer 150 accepts the angle measurements 152 and moves a virtual instrument synchronously with the motion of the mechanism 10. If desired, the computer program computes the required force to be reflected to the users hand, when, for example, the virtual probe touches a virtual surface. The program uses kinematics algorithms to convert this required force to a required motor torque, then to a voltage known to produce that torque which is fed to a digital to analogue converter 158. The output of the D/A converter 158 is fed to a voltage to current converter 160 connected to the motor 101. The current applied to the motor 101 then produces the required torque.

In a preferred embodiment, the motor 101 is a 10-Watt DC motor from Maxon, Model 118746, with precious-metal brushes, although the 20-Watt Model 118752 with carbon brushes may also be used, with its increased power but slightly greater commutation noise. The D/A converter 158 is a PCI-6208 converter from Adlink, while the voltage to current converter 160 for each motor is a model PA12A converter from Apex. The rotational sensors 68 is a magneto-resistance sensor from Midori America Corporation, Model CP-2UPX. The A/D converter 156 for up to eight sensors is a KPCI-3107 converter from Keithley.

The embodiments of the invention described above are intended to be exemplary. Those skilled in the art will therefore appreciate that the foregoing description is illustrative only, and that various alternatives and modifications can be devised without departing from the spirit of the present invention. Accordingly, the present is intended to embrace all such alternatives, modifications and variances which fall within the scope of the appended claims.

The invention claimed is:

1. A replaceable instrument mechanism for a haptic device, comprising:
 a coupler having:
   a coupler body with a first end and a second end, the first end adapted to be connected to an output end of the haptic device so as to be displaceable along degrees-of-freedom of the haptic device; and
   a force transmission mechanism connected to the coupler body, the force transmission mechanism having a movable connector displaceable along at least one rotational degree-of-freedom with respect to the coupler body, the force transmission mechanism adapted to be connected to a force feedback system of the haptic device so as to receive force feedback from the haptic device and impart the force feedback to the movable connector;
 at least one instrument having:
   a fixed handle portion having a connector end releasably secured to the second end of the coupler body so as to be fixed to and displaceable with the coupler;
   a movable handle portion manually actuatable in at least one rotational degree-of-freedom with respect to the fixed handle portion to simulate a scissor operation performed with the instrument; and
   a pivot member connected to and different from the movable handle portion about which the movable handle portion rotates during the scissor operation, and with the movable handle portion being connected at the pivot member to the movable connector of the force transmission mechanism and being different from the movable connector so as to have the movable handle portion rotate concurrently with the movable connector about a singular common axis of scissor movement to transmit force feedback from the movable connector to the movable handle portion in response to actuation of the movable handle portion as detected by the haptic device.

2. The replaceable instrument mechanism according to claim 1, wherein the movable connector is a pulley, and the pulley and the movable handle portion are integrally connected to concurrently rotate about said common axis.

3. The replaceable instrument mechanism according to claim 1, wherein the movable connector is a pulley, and the force transmission system has a drive pulley related to the movable connector by a mechanism enabling rotational degree-of-freedom transmission therebetween, the drive pulley adapted to be connected to the force feedback system of the haptic device by a tendon.

4. The replaceable instrument mechanism according to claim 1, further comprising a rotational degree-of-freedom joint between the coupler body and the output end of the haptic device, with an axis of the rotational degree-of-freedom joint being generally parallel to a longitudinal axis of the fixed handle portion.

5. The replaceable instrument mechanism according to claim 3, wherein the force feedback system of the haptic device has a tendon guided by idlers to direct the tendon across a rotational degree-of-freedom joint between the coupler and the output end of the haptic device and onto the drive pulley.

6. The replaceable instrument mechanism according to claim 5, wherein the idlers direct the tendon generally normal to the axis of the rotational degree-of-freedom joint.

7. The replaceable instrument mechanism according to claim 6, wherein the tendon crosses over itself at the rotational degree-of-freedom joint.

8. The replaceable instrument mechanism according to claim 7, wherein the tendon crossover is assisted by an idler comprised of an inside idler and an outside idler, the inside idler being positioned inside the outside idler, the axes of rotation of the two idlers crossing at a slight angle, the idlers on one side of the rotational degree-of-freedom joint being displaced inwardly relative to the idlers on the other side.

9. The replaceable instrument mechanism according to claim 6, wherein the tendon is helically wound about the rotational degree-of-freedom joint.

10. The replaceable instrument mechanism according to claim 5, wherein the tendon is wrapped around a capstan fixedly attached to a shaft of a rotary motor fixedly connected to a fixed portion of the haptic device, the rotary motor producing the force feedback in the instrument.

11. The replaceable instrument mechanism according to claim 3, further comprising a rotational sensor coupled to the pulley of the movable connector of the force transmission mechanism to transmit data corresponding to a rotational displacement of the movable handle portion with respect to the fixed handle portion to the force feedback system to calculate a current position and orientation of the movable handle portion.

12. The replaceable instrument mechanism according to claim 11, wherein the data is an orientation of the movable handle portion with respect to the fixed handle portion.

13. The replaceable instrument mechanism according to claim 1, wherein the movable handle portion has a finger-handled portion that is removeably connected to a remainder of the movable handle portion.

14. The replaceable instrument mechanism according to claim 1, wherein the fixed handle portion has a finger-handled portion that is removeably connected to a remainder of the fixed handle portion.

15. The replaceable instrument mechanism according to claim 1, further comprising spring material biasing the movable handle portion and the fixed handle portion away from one another.

* * * * *